Figure 1:
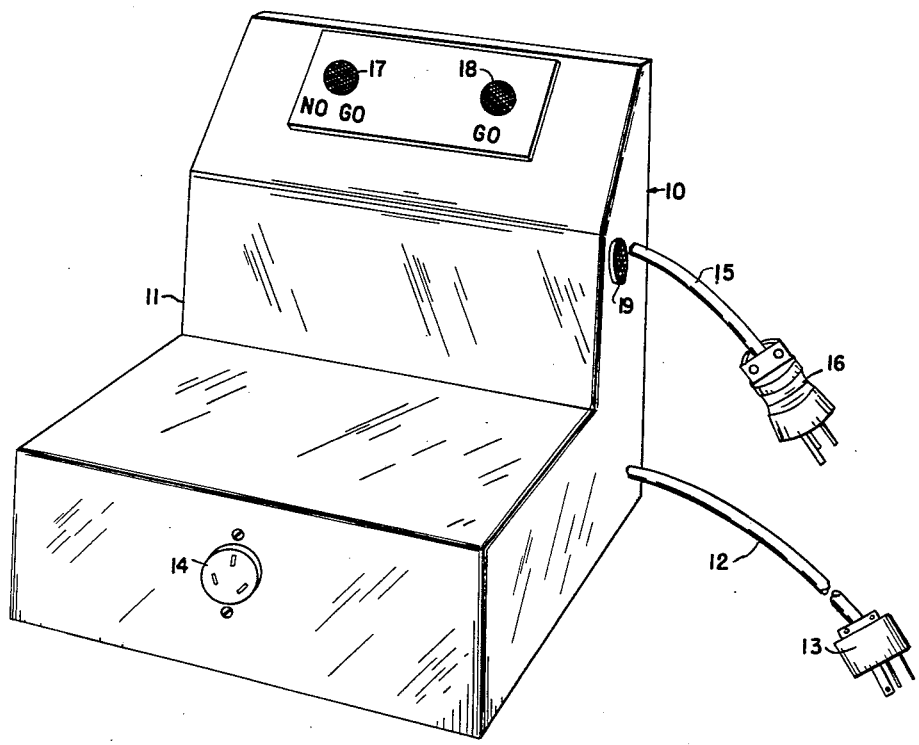

Sept. 17, 1957     E. J. MATOUSEK     2,806,993

TOOL TESTER

Filed June 22, 1953     2 Sheets—Sheet 1

INVENTOR.
EDWARD J. MATOUSEK

ATTY.

Sept. 17, 1957　　　　　　　E. J. MATOUSEK　　　　　　　2,806,993
TOOL TESTER
Filed June 22, 1953　　　　　　　　　　　　　　2 Sheets-Sheet 2
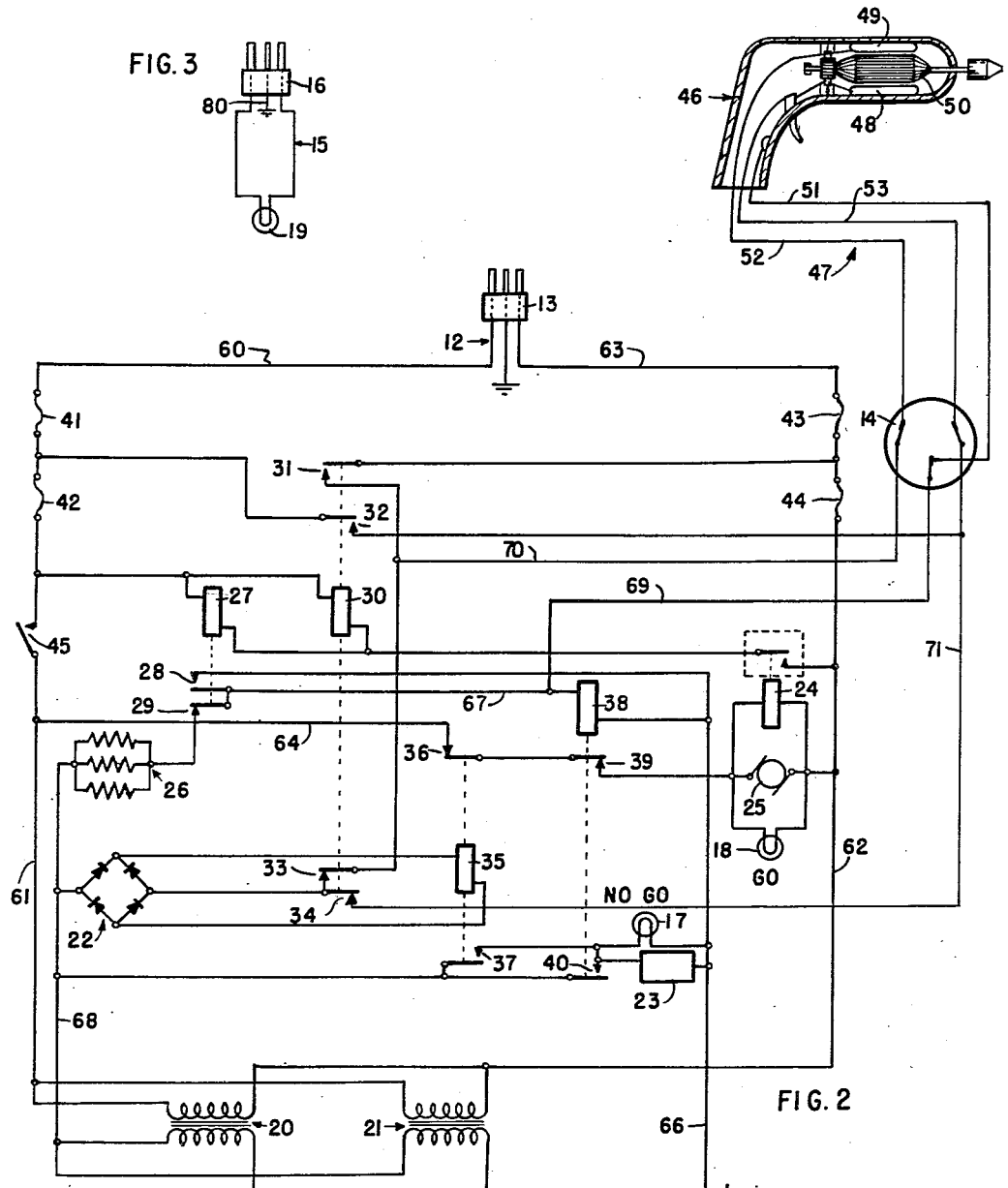
INVENTOR.
EDWARD J. MATOUSEK
Paul O. Pippel
ATTY.

though a power cord and plug. Normally power source of 110 volts A. C. would be used since the great majority of hand tools are operated with this voltage. A female plug or receptacle 14 is provided at the front of the cabinet 10, and it is into this plug 14 which the hand tool to be tested is plugged. Further, a short length of cord 15 and a three pronged male plug 16 is also provided. The plug 16 is used in conjunction with the testing of extension cords. The female plug of the extension cord is connected to the plug 16 and the male plug of the extension cord is plugged into the plug 14. Three indicating lamps 17, 18, and 19 are also provided. Each of these indicating lamps serves a separate function and may be colored to indicate the different functions. The indicating lamp 17 which indicates a defective hand tool may be colored red. The indicating lamp 18 which serves to indicate a satisfactory hand tool may be colored green. The markings NO GO are placed upon the cabinet 10 adjacent to indicating lamp 17, and the marking GO is placed upon the cabinet 10 adjacent to indicating lamp 18, to simply indicate that when lamp 17 is lit, the tool is no good and when lamp 18 is lit the tool is good. The indicating lamp 19 which indicates a satisfactory extension cord may be colored white.

United States Patent Office

2,806,993
Patented Sept. 17, 1957

2,806,993

TOOL TESTER

Edward J. Matousek, La Grange Park, Ill.

Application June 22, 1953, Serial No. 363,354

18 Claims. (Cl. 324—51)

This invention relates generally to electrical testing apparatus and more specifically to an improved electrical tester for testing the conditions of small electrical hand tools.

As is well known in the art, serious shock hazards are present when electrical hand tools are used about equipment or power lines in which industrial voltages are present. These voltages which may have a magnitude of 440 volts can cause serious accidents if, for example, an electric hand drill is accidentally drilled into such a power line. It is, therefore, important that hand tools which are used where such power is present be properly grounded so that should the tool be caused to come in direct contact with a power line, the current from the power line may easily be grounded through the tool rather than through the operator of the tool.

Additionally, since the voltages used to operate the electric hand tool may also be substantial, it is of further importance that the current carrying portions of the hand tool be properly insulated from the case of the tool. Should a current carrying portion of the hand tool be shorted to the case of the tool, the operator may receive an electrical shock when an attempt is made to operate the tool.

Because of the uses and abuse electrical hand tools usually receive, troubles may easily occur, and it is therefore necessary that electrical hand tools be checked or tested at frequent intervals to insure proper protection to the operator of the tool.

It is therefore an object of this invention to provide a simple electrical hand tool tester which will permit easy frequent testing, which will give positive results, without any danger of an electrical shock to the person operating the tester, and which may be used by a person unskilled in electrical matters or safety testing.

It is a feature of this invention that structure is provided whereby the operator need only connect the hand tool into the plug provided, ground the case of the tool against the tester, and operate the starting switch of the hand tool, to effectively test the hand tool.

Other objects and features of the present invention will be apparent upon a perusal of the following specification and claims of which:

Figure 1 is a perspective view of the complete tester;
Figure 2 is a diagrammatic view of the structure of the present invention; and,
Figure 3 is a diagrammatic view of a portion of the present invention necessary for the testing of extension cords.

The present embodiment is the preferred embodiment but it is to be understood that changes can be made in the present embodiment by one skilled in the art without departing from the spirit and scope of this invention.

For a general description of the invention reference is made to Figure 1. The various components of the tester are mounted within a cabinet 10, the shape of which can easily be seen in Figure 1. The cabinet 10 is fabricated of some metal which is a good conductor of electricity. A vertical plate 11 is provided as a portion of the cabinet 10. This vertical plate 11 may be hinged to the cabinet 10 so as to be slightly movable. Thus a starting switch can be mounted in contact with the plate 11 so that when the hand tool under test is pressed against the plate 11, the starting switch is closed to energize the tester. A power cord 12 projects from the cabinet 10 and has a three pronged plug 13 at the end thereof. It is intended that the plug 13 be connected to some power source. Normally a power source of 110 volts A. C. would be used since the great majority of hand tools are operated with this voltage. A female plug or receptacle 14 is provided at the front of the cabinet 10, and it is into this plug 14 which the hand tool to be tested is plugged. Further, a short length of cord 15 and a three pronged male plug 16 is also provided. The plug 16 is used in conjunction with the testing of extension cords. The female plug of the extension cord is connected to the plug 16 and the male plug of the extension cord is plugged into the plug 14. Three indicating lamps 17, 18, and 19 are also provided. Each of these indicating lamps serves a separate function and may be colored to indicate the different functions. The indicating lamp 17 which indicates a defective hand tool may be colored red. The indicating lamp 18 which serves to indicate a satisfactory hand tool may be colored green. The markings NO GO are placed upon the cabinet 10 adjacent to indicating lamp 17, and the marking GO is placed upon the cabinet 10 adjacent to indicating lamp 18, to simply indicate that when lamp 17 is lit, the tool is no good and when lamp 18 is lit the tool is good. The indicating lamp 19 which indicates a satisfactory extension cord may be colored white.

For a detailed description of the structure enclosed by the cabinet 10 and connected to the various components of the present invention described above, reference is made to Figures 2 and 3. Two transformers 20 and 21 are provided for stepping down the line voltage to a voltage of approximately 7½ volts as a safe test voltage with which to test the ground connections of the tool. A rectifier 22, such as a full wave copper oxide bridge rectifier, is also provided to test the current carrying portions of the hand tool. A buzzer 23 is provided to operate in conjunction with the indicating lamp 17 as an aural indicator to indicate a defective hand tool. A time delay relay 24 and motor 25 therefor is provided in conjunction with the lamp 18 to initiate a timing cycle before the line voltage is applied to the hand tool to test its operation. The time interval of the timing cycle permits completion of other tests before the line voltage is applied to the tool. Also, the completion of the timing cycle is dependent upon a favorable conclusion of the other tests. Thus the operator of the tester can not receive an electrical shock from a defective tool by the application of power to such a tool. A network of resistors 26 are provided in conjunction with the transformers 20 and 21 to limit the current used in testing the hand tool for a defective grounding wire. Also, four relays with their associated contacts are provided. These relays are relay 27 with its make contacts 28 and its break contacts 29, relay 30 with its make contacts 31 and 32, break contacts 33 and 34, relay 35 with its break contacts 36 and make contacts 37, relay 38 with its break contacts 39 and its make contacts 40. The remaining structure which is provided comprises four fuses 41, 42, 43 and 44, and a start switch 45.

For purposes of explanation, a hand drill 46 is shown connected into the female plug 14 by its cord 47. The hand drill 46 comprises a casing 48, a field 49 and an armature 50. The case 48 is connected to the conductor 51 of the cord 47, and the armature 50 and the field 49 are connected to the conductors 52 and 53 of the cord 47.

Turning next to a detailed description of the operation and connections of the various components of the present invention, reference is made to Figures 1 through 3. The switch 45 mounted adjacent to the previously described vertical plate 11 so that switch 45 is closed when pressure is applied against the vertical plate 11 and opened when the vertical plate 11 is released. When the male plug 13 is connected to a power source and the start switch 45 is closed, the following circuits are completed: from the power supply connected to plug 13, through the cord 12, conductor 60, fuse 41, fuse 42, switch 45, conductor 61, through the primaries of the transformers 20 and 21 which are connected in parallel, conductor 62, fuse 44, fuse 43, conductor 63, and back through the cord 12 to the power supply present at the plug 13; and from the power supply present at the plug 13 through the cord 12 conductor 60, fuse 41, fuse 42, switch 45, conductor 64, contacts 36, contacts 39, the motor 25 of the time delay relay 24 and the lamp 18, conductor 62, fuse 44, fuse 43, conductor 63, and through the cord 12 to the plug 13. As can easily be seen, the first of these described circuits causes the energization of the primaries of the transformers 20 and 21. The second of the described circuits energizes the motor 25 of the time delay relay 24 and the lamp 18. The lamp 18 will light, and the motor 25 will operate for a time interval at the end of which the motor 25 will close a circuit for the energization of the time delay relay 24 in parallel therewith. The function of the time delay relay 24, as described above, is to permit a time delay before the power supply is connected to the field and armature of the hand tool under test in order that certain preliminary tests to be described below may be accomplished.

The first test which is made is concerned with the proper grounding of the case 48 of the hand drill 46. For this test the case 48 of the hand drill 46 is pressed against the plate 11 of the cabinet 10 as seen in Figure 1. If the case 48 of the hand drill 46 is not properly grounded, the following circuit will be completed: the secondaries of the two transformers 20 and 21 which are connected in parallel, conductor 66, relay 38, conductor 67, contacts 29, resistor network 26, conductor 68, to the secondaries of the transformers 20 and 21. This circuit results in the energization of relay 38 which operates to open contacts 39 and to close contacts 40. The opening of contacts 39 breaks the previously described circuit for the operation of the time delay motor 25 and the lamp 18. The lamp 18 is extinguished, and the time delay motor 25 is automatically reset by means associated therewith (not shown), which are well known in the art. The closing of contacts 40 completes the following circuit: the secondaries of the transformers 20 and 21, conductor 66, buzzer 23 and the lamp 17 in parallel, contacts 40 and conductor 68 to the secondaries of the transformers 20 and 21. This results in an illumination of the lamp 17 and a sounding of the buzzer 23 to indicate to the operator of the test equipment that the hand tool under test is defective. The hand drill 46 may then be repaired by a qualified repairman.

If the case 48 of the hand drill 46 is properly grounded the relay 38 is shunted and prevented from being energized by the following circuit: from one side of the relay 38, to conductor 66, to ground 65 which is a direct connection to the electrically conductive plate 11 of the cabinet 10 of the tester, through the case 48 of the hand drill 46, conductor 51 of the cord 47 of the hand drill 46, through the female plug 14, through conductor 69 to the other side of the relay 38. The lamp 18 will remain lit to indicate to the operator of the tester that the case 48 of the hand drill 46 is properly grounded.

Simultaneously with the testing of the proper grounding of the case 48 of the hand drill 46, the second test, that of testing as to whether the armature 50 or the field 49 of the hand drill 46 may be shorted to the case 46.

This test is accomplished through the following circuit: from the winding 49 and the armature 50, through the conductor 52 of the cord 47, through the female plug 14, through the conductor 70, through the contacts 33 to the bridge rectifier 22, and also from the field 49 and the armature 50 through the conductor 51 of the cord 47, through the female plug 14, through the conductor 71, and through the contacts 34 to the bridge rectifier 22 with both of these branches continuing from the bridge rectifier 22 through the relay 35, conductor 68, the secondaries of the transformers 20 and 21, ground 65, to the case 48 of the hand drill 46. If the field 49 or the armature 50 is not grounded to the case 48, this circuit is incomplete, however, if the armature 50 or the field 49 is grounded to the case 48, this circuit will be completed and current will flow to cause the operation of the relay 35. Relay 35 will then operate to open its contacts 36 and to close its contacts 37. The opening of contacts 36 will break the previously described circuit for the operation of the time delay motor 25 and the lamp 18. As previously described, when this latter circuit is broken, the time delay motor 25 will restore and the lamp 18 will be extinguished. The closing of contacts 37 will complete the following circuit: the secondaries of the transformers 20 and 21, conductor 66, buzzer 23 and the lamp 17, contacts 37, conductor 68 to the secondaries of the transformers 20 and 21. The completion of this circuit will result in the illumination of the lamp 17 and the operation of the buzzer 23 to warn the operator of the test equipment that the hand drill 46 is defective.

If the hand drill 46 passes both of the previously described tests, in other words if the lamp 18 remains lit, and the lamp 17 is extinguished and the buzzer 23 is not sounded, the time delay motor 25 will, after a period of approximately five seconds, close a circuit for the energization of the time delay relay 24. The time delay relay 24 will close its contacts to complete the following circuits: the male plug 13 connected to the power supply, the cord 12, conductor 60, fuses 41 and 42, relays 27 and 30 the closed contacts of the time delay relay 24, fuses 44 and 43, conductor 63, cord 12 to the plug 13. This circuit will result in the energization of relays 27 and 30 which will operate. Relay 27 will close its contacts 28 and open its contacts 29. Relay 30 will close its contacts 31 and 32 and will open its contacts 33 and 34. The closing of contacts 28 will place a shunt about the relay 38. The opening of contacts 29 will result in a breaking of the previously described circuit for testing the proper grounding of the case 48 of the hand drill 46. The opening of contacts 33 and 34 will break the previously described circuits for the testing as to whether or not the armature 50 or the field 49 is shorted to the case 48 of the hand drill 46. The closing of contacts 31 and 32 will complete the following circuit: plug 13 connected to the power supply, cord 12, conductor 60, fuse 41, contacts 32, female plug 14, conductor 53 of the cord 47, the field 49 and the armature 50 of the hand drill, conductor 52 of the cord 47, female plug 14, conductor 70, contacts 31, fuse 43, conductor 63, cord 12 to the plug 13. If the starting switch on the hand drill 46 is then operated by the operator, the power supply will then be connected to the hand drill and if there are no other defects in the hand drill 46, the hand drill 46 will operate.

The afore described operation of the present invention completes an example of how the present invention may be used to test the condition of a hand drill 46. To restore the tester to normal, the switch 45 is opened. This will cause the time delay motor 25 to restore to normal. The operating circuit for the time delay relay 24 will be broken and the time delay relay 24 will restore to open its contacts. When the time delay relay 24 restores, the operating circuit for the relays 27 and 30 will be broken and these relays will restore.

As described previously, the present invention may also be used to test extension cords. To test an extension cord, the male plug of the extension cord is inserted into the female plug 14, and the female plug of the extension cord is connected to the male plug 16. The switch 45 is then closed, energizing the primaries of the transformers 20 and 21 and completing the previously described circuit for the energization of relay 38. However, if the ground conductor of the extension cord is good, the following shunt will be connected about the relay 38 thereby preventing its energization and operation: one side of the relay 38 conductor 66, ground 65, ground 80 which is connected to the cabinet 10 of the tester, plug 16, the female plug of the extension cord, the ground wire of the extension cord, the male plug of the extension cord, female plug 14, conductor 69 to the other side of the relay 38. Since relay 38 is prevented from being energized, contacts 40 will not be closed to complete the previously described circuits for the operation of the lamp 17 and the buzzer 23.

To test the condition of the other two conductors of the extension cord, the following circuit is completed: the other two conductors of the extension cord, the male plug of the extension cord, female plug 14, from female plug 14 in parallel through conductor 70 and contacts 33 to the bridge rectifier 22 and through conductor 71 and contacts 34 to bridge rectifier 22, the bridge rectifier 22, the relay 35, conductor 68, the secondaries of the transformers 20 and 21 to ground 65. If either of the other two conductors of the extension cord are grounded to the ground conductor of the extension cord a circuit will be completed from the ground 65 through the grounded conductor of the extension cord, through the ground conductor of the extension cord to ground 80. This will cause an energization of relay 35 which will operate as previously described to open its contacts 36 and to close its contacts 37 to thereby brake the operating circuit for the time delay motor 25 and to energize the lamp 17 and the buzzer 23. If neither of the other two conductors of the extension cord are grounded to the ground conductor of the extension cord, the time delay motor 25 will, after approximately five seconds, cause the operation of the time delay relay 24 which will close its contacts. As previously described the closing of the time delay relay contacts will cause an energization of relays 27 and 30, and as previously described the operation of these relays will cause a breaking of the testing circuits previously described, and a completing of a circuit applying the power source to the extension cord. This latter circuit may be traced as follows: plug 13 connected to power source, cord 12, conductor 60, fuse 41, contacts 32, female plug 14, the male plug of the extension cord, one of the conductors of the extension cord, the female plug of the extension cord, plug 16, one of the conductors of the cord 15, lamp 19, the other conductor of the cord 15, plug 16, the female plug of the extension cord, the other conductor of the extension cord, the male plug of the extension cord, female plug 14, conductor 70, contacts 31, fuse 43, conductor 63, cord 12 to plug 13. If both of the other two conductors are good, the above described circuit is completed to cause an illumination of the lamp 19 to thereby indicate that the extension cord under test is satisfactory.

Although the instant invention was described as applying to a tester for testing the condition of hand tools operated by a single phase power system, the present invention can be easily adapted to the testing of hand tools operated by a multiphase power source.

Having described the invention what is considered new and desired to be protected by Letters Patent is:

1. In a tester for an electrical hand tool, a cabinet, a portion of said cabinet being an electrical conductor, a first means mounted within said cabinet connected to said electrical conductor and connectable to said hand tool and operating responsive to a contact by the case of said tool with said electrical conductor for indicating the condition of the ground connection to the case of said tool, a second means mounted within said cabinet and connected to said electrical conductor and connectable to said tool and operating responsive to a contact by said case of said tool with said electrical conductor when said tool is connected thereto for indicating the condition of the insulation of the other portions of said tool from ground, a third means mounted within said cabinet and operable to apply power to said tool to test the operation thereof and a fourth means mounted within said cabinet operating responsive to the operation of said first means and said second means for controlling the operation of said third means.

2. In a tester for an electrical hand tool, a cabinet, an electrical conductor formed as a part of said cabinet, a first means mounted within said cabinet and connected to said electrical conductor and connectable to said tool and operating responsive to a contact by the case of said tool with said cabinet when said tool is connected thereto for testing and indicating the condition of a ground connection to the case of said tool, a second means mounted within said cabinet and connected to said electrical conductor and connectable to said tool and operating responsive to a contact by said case of said tool with said electrical conductor when said tool is connected thereto for testing and indicating for a proper insulation of the other portions of said tool from ground, a third means mounted within said cabinet and connectable to said tool for applying power to said tool to test the operation thereof, timing means for delaying the operation of said third means, a fifth means operating responsive to the operation of said first means and said second means for controlling the operation of said third means.

3. In a tester for an electrical hand tool, a cabinet formed of an electrically conductive material, a first means mounted within said cabinet operable to test for a proper ground connection to the case of said tool, a second means mounted within said cabinet operable to test for a proper insulation of the other portions of said tool from ground, a third means mounted within said cabinet operable to apply power to said tool to test the operation thereof, a plug mounted in one wall of said cabinet for connection of said tool thereto, said first, second and third means associated with said plug, said first and second means associated with said cabinet, said first and second means operating responsive to a contact by said case of said tool with said cabinet when said tool is connected to said plug, said third means operating responsive to the finding of a proper ground connection to the case of said tool and to the finding of a proper insulation of said other portions of said tool from ground by said first and second means.

4. In a tester for an electrical hand tool, a cabinet formed of an electrically conductive material, a plug mounted in one wall of said cabinet for connection of said tool thereto, a first means connected to said plug and to said cabinet and operating responsive to a contact by the case of said tool with said cabinet when said tool is connected to said plug for testing for a proper ground connection to the case of said tool, a second means connected to said plug and to said cabinet and operating responsive to a contact by the case of said tool with said cabinet when said tool is connected to said plug for testing for a proper insulation of the other portions of said tool from ground, and a third means connected to said plug and associated with said first and second means and operating responsive to the finding of a proper ground connection to the case of said tool and to the finding of a proper insulation of said other portions of said tool from ground for applying power to said tool to test the operation thereof.

5. In a tester for an electrical hand tool, a cabinet formed of an electrically conductive material, a plug mounted in one wall of said cabinet for connection of said tool thereto, first indicating means for indicating a satisfactory condition, second indicating means for indicating an unsatisfactory condition, third means connected to said plug and to said cabinet and operating responsive to a contact by the case of said tool with said cabinet when said tool is connected to said plug for controlling the operation of said first and second means, and fourth means connected to said plug and associated with said third means and operating responsive to a particular operation of said third means for applying power to said tool to test the operation thereof.

6. In a tester for an electrical hand tool, a cabinet formed of an electrically conductive material, a plug mounted in one wall of said cabinet for connection of said tool thereto, first indicating means mounted to said cabinet for indicating that the case of said tool has a proper ground connection and for indicating that the other portions of said tool are properly insulated from ground, second indicating means for indicating that the case of said tool is improperly grounded and for indicating that the other portions of said tool are improperly insulated from ground, third means connected to said plug and to said cabinet and operating responsive to a contact by the case of said tool with said cabinet when said tool is connected to said plug for testing for the proper ground connection to the case of said tool and for causing the operation of said first and second means dependent upon the test, fourth means connected to said plug and to said cabinet and operating responsive to a contact by the case of said tool with said cabinet when said tool is connected to said plug for testing for a proper insulation of the other portions of said tool from ground and causing the operation of said first and second means dependent upon the results of said testing, and fifth means connected to said plug and associated with said third and fourth means and operating responsive to the finding of a proper ground connection to the case of said tool and to the finding of a proper insulation of said other portions of said tool from ground for applying power to said tool to test the operation thereof.

7. In a tester for an electrical hand tool, a cabinet formed of an electrically conductive material, a plug mounted in one wall of said cabinet for connection of said tool thereto, first means connected to said plug and to said cabinet and operating responsive to a contact by the case of said tool with said cabinet when said tool is connected to said plug for testing for a proper ground connection to the case of said tool, second means connected to said plug and to said cabinet and operating responsive to a contact by said case of said tool with said cabinet when said cabinet when said tool is connected to said plug for testing for a proper insulation of the other portions of said tool from ground, third means connected to said plug for applying power to said tool to test the operation thereof, and fourth means operating responsive to the operation of said first and second means for controlling the operation of said third means.

8. In a tester for an electrical hand tool, a cabinet formed of an electrically conductive material, a plug mounted in one wall of said cabinet for connection of said tool thereto, first means connected to said plug and said cabinet and operating responsive to a contact by the case of said tool with said cabinet when said tool is connected to said plug for testing for a proper ground connection to the case of said tool, second means connected to said plug and to said cabinet and operating responsive to a contact by said case of said tool with said cabinet when said tool is connected to said plug for testing for a proper insultaion of the other portions of said tool from ground, third means connected to said plug for applying power to said tool to test the operation thereof, fourth timing means for delaying the operation of said last-mentioned means, fifth means operating responsive to the operation of said first and second means for controlling the operation of said third means, and sixth means operating responsive to the operation of said first and second means for controlling the operation of said fourth means.

9. In a tester for an electrical hand tool, a cabinet formed of electrically conductive material, a plug mounted in one wall of said cabinet for connection of said tool thereto, first, indicating means for indicating the condition of said hand tool, second means connected to said plug and to said cabinet and operating responsive to a contact by the case of said tool with said cabinet when said tool is connected to said plug for testing for a proper ground connection to the case of said tool and for causing the operation of said first means to indicate the results of the testing third means connected to said plug and to said cabinet and operating responsive to a contact by said case of said tool with said cabinet when said tool is connected to said plug for testing for a proper insulation of the other portions of said tool from ground and for operating said first means to indicate the results of said testing, fourth means connected to said plug for applying power to said tool to test the operation thereof, and fifth means operating responsive to the operation of second and third means for controlling the operation of said fourth means.

10. In a tester for an electrical hand tool, a cabinet formed of an electrically conductive material, a plug mounted in one wall of said cabinet for connection of said tool thereto, first indicating means operable to indicate the condition of said hand tool, second means connected to said plug and to said cabinet and operating responsive to a contact by the case of said tool with said cabinet when said tool is connected to said plug for testing the ground connection to the case of said tool, and for operating said first means to indicate the condition of the ground connection to the case of said tool, third means connected to said plug and to said cabinet and operating responsive to a contact by said case of said tool with said cabinet when said tool is connected to said plug for testing for a proper insulation of the other portions of said tool from ground and for operating said first means to indicate the condition of the insulation of the other portions of said tool from ground, fourth means connected to said plug for applying power to said tool to test the operation thereof, timing means for delaying the operation of said fourth means, and sixth means operating responsive to the operation of said second and said third means, for controlling the operation of said timing means.

11. In a tester for an electrical hand tool, a cabinet formed of an electrically conductive material, a plug mounted to one wall of said cabinet for connection of said tool thereto, a transformer mounted within said cabinet, means for applying power to the primary of said transformer, means connected to the secondary of said transformer and to a relay for operating said relay, means for preventing the operation of said relay, said last-mentioned means comprising a shunt circuit connected about said relay, said shunt circuit including said plug and a ground connection to the case of said tool and said cabinet when said tool is connected to said plug and said case of said tool is in contact with said cabinet, whereby said shunt circuit is incomplete when said ground connection to the case of said tool is broken, indicating means operating responsive to the operation of said relay for indicating that said ground connection to the case of said tool is broken, and means operating responsive to the non-operation of said relay for indicating that said ground connection to the case of said tool is not broken.

12. In a tester as claimed in claim 11, means for limiting the amount of current flowing in said shunt circuit.

13. In a tester for an electrical hand tool, a cabinet formed of an electrically conductive material, a plug mounted in one wall of said cabinet for connection of said tool thereto, a transformer mounted within said cabinet, means for applying power to the primary of said transformer, a bridge rectifier, a relay, circuit means connecting the secondary of said transformer in series with said bridge rectifier and said relay, said circuit means including the portions of said hand tool normally insulated from the case thereof and said plug and the case of said tool when said tool is connected to said plug and said case of said tool is in contact with said cabinet, said circuit means forming a complete electrical circuit when the portions of said tool normally insulated from the case thereof are in electrical contact with said case, whereby said relay operates when said portions of said tool normally insulated from said case are in electrical contact with said case, indicating means operating responsive to the operation of said relay for indicating the contact of said normally insulated portions of said tool with said case, and indicating means operating responsive to the non-operation of said relay for indicating the normal insulation of said insulated portions of said hand tool from said case.

14. In a tester for an electrical hand tool, a cabinet, an electrical conductor formed as a part of said cabinet, a plug mounted in one wall of said cabinet for connection of said tool thereto, a transformer mounted within said cabinet, means for applying power to the primary of said transformer, a relay, circuit means connecting the secondary of said transformer in series with said relay, the portions of said hand tool normally insulated from the case thereof, said plug, and the case of said tool when said tool is connected to said plug and the case of said tool is in contact with said electrical conductor, said circuit means operating to form a complete electrical circuit when the portions of said tool normally insulated from the case thereof are in electrical contact with said case, whereby said relay operates when said portions of said tool normally insulated from the case are shorted to said case, and whereby said relay is non-operative when said portions of said tool are normally insulated from said case.

15. In a tester for an electrical hand tool as claimed in claim 14, indicating means operating responsive to the operation of said relay for indicating the shorting of said normally insulated portions of said tool to said case, and indicating means operating responsive to the non-operation of said relay for indicating the normal insulation of said insulated portions of said hand tool from said case.

16. In a tester for an electrical hand tool as claimed in claim 14, means mounted within said cabinet for applying power to said hand tool for testing the operation thereof, means associated with said relay operating responsive to the operation of said relay for preventing the operation of said last-mentioned means.

17. In a tester for an electrical hand tool as claimed in claim 14, timing means for applying power to said tool after a predetermined time interval to test the operation thereof, and means operating responsive to the operation of said relay for disabling said last-mentioned means.

18. In a tester for an electrical hand tool, a cabinet, an electrical conductor formed in a portion of said cabinet, a relay, a power source for said relay, circuit means connecting one side of said power source to said relay, second circuit means connecting the other side of said power source to said electrical conductor, third circuit means connecting said relay to the portions of said tool normally insulated from the case thereof, whereby an operating circuit for said relay is completed when said case of said hand tool is in contact with said electrical conductor and said normally insulated portions of said tool are connected to said case, indicating means operating responsive to the operation of said relay for indicating the contact of said normally insulated portions of said tool with said case, and indicating means operating responsive to the non-operation of said relay for indicating the normal insulation of said insulated portions of said hand tool from said case, means for applying power to said hand tool to test the operation thereof, and means operating responsive to the operation of said relay for disabling said last-mentioned means.

References Cited in the file of this patent

UNITED STATES PATENTS

| | | |
|---|---|---|
| 1,251,750 | Clausen | Jan. 1, 1918 |
| 1,969,713 | Bullock | Aug. 14, 1934 |
| 2,442,771 | Kirkpatrick, Jr. | June 8, 1948 |